Nov. 6, 1956 F. R. McFARLAND 2,769,307
HYDRAULICALLY OPERATED SERVO-MOTOR
Filed July 14, 1950 3 Sheets-Sheet 1
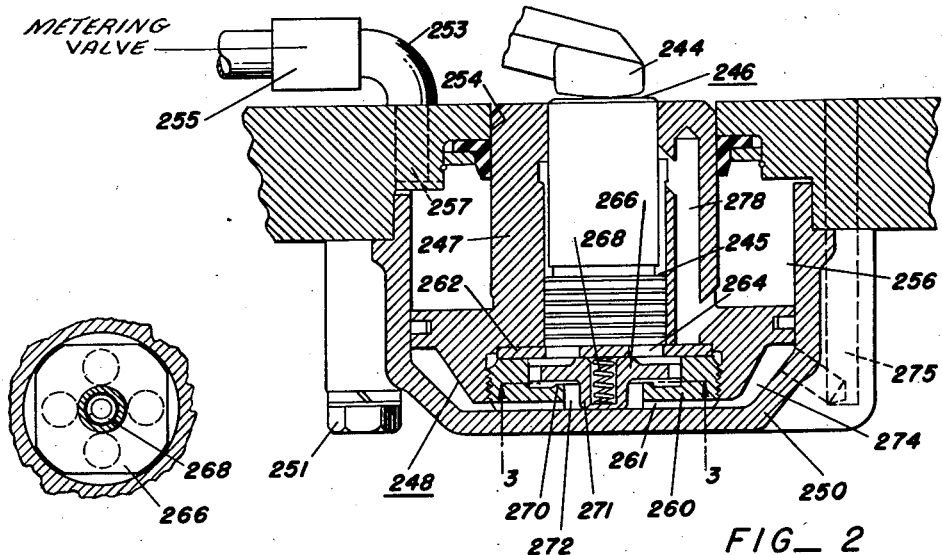
FIG_3  FIG_2
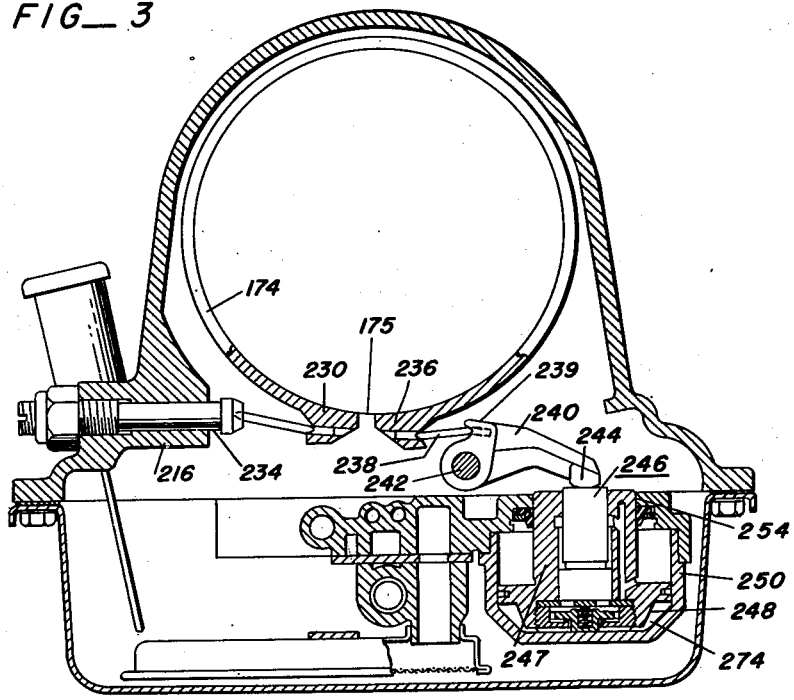
FIG_1
Inventor
FOREST R. McFARLAND
By Davis, Lindsey, Hibben + Noyes
Attorneys Nov. 6, 1956     F. R. McFARLAND     2,769,307
HYDRAULICALLY OPERATED SERVO-MOTOR
Filed July 14, 1950     3 Sheets-Sheet 2
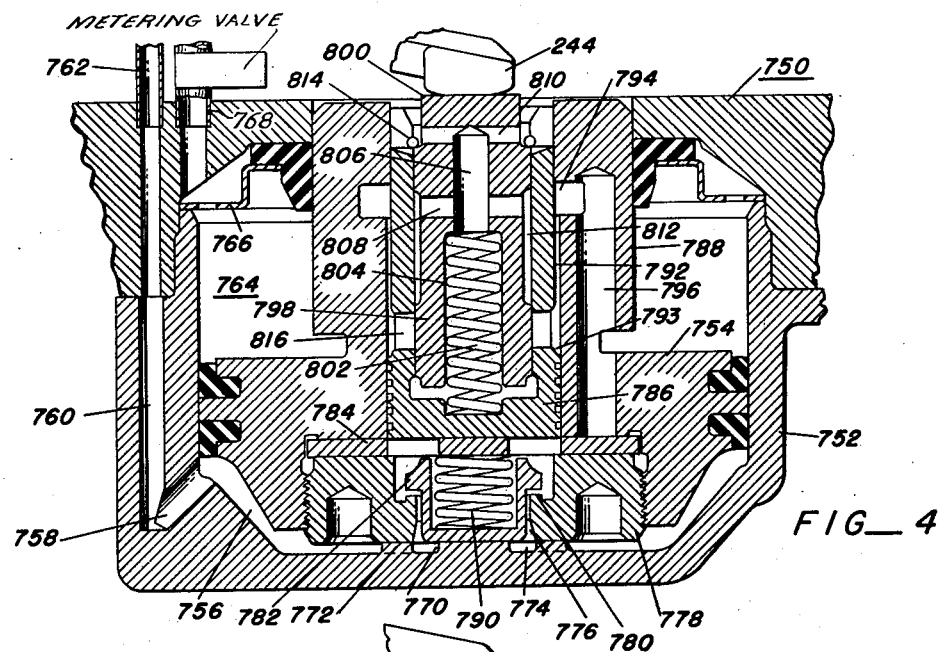
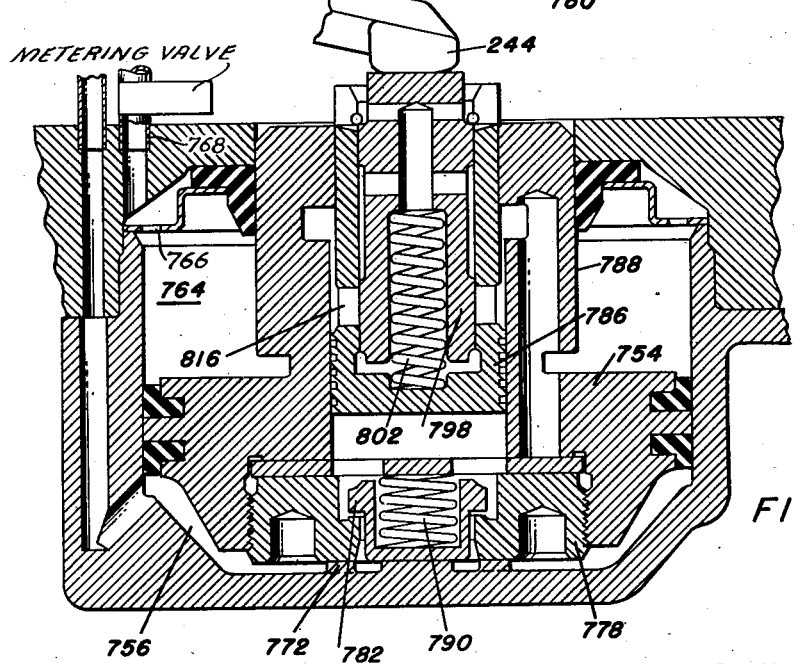
Inventor
FOREST R. McFARLAND
By Davis, Lindsey, Hibben + Noyes
Attorney Nov. 6, 1956  F. R. McFARLAND  2,769,307
HYDRAULICALLY OPERATED SERVO-MOTOR
Filed July 14, 1950  3 Sheets-Sheet 3
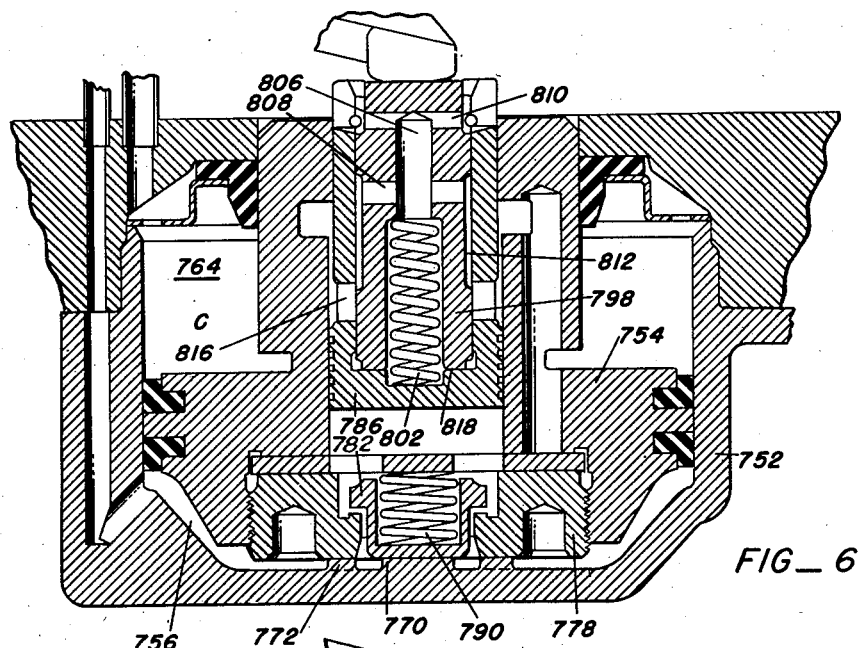
FIG_6
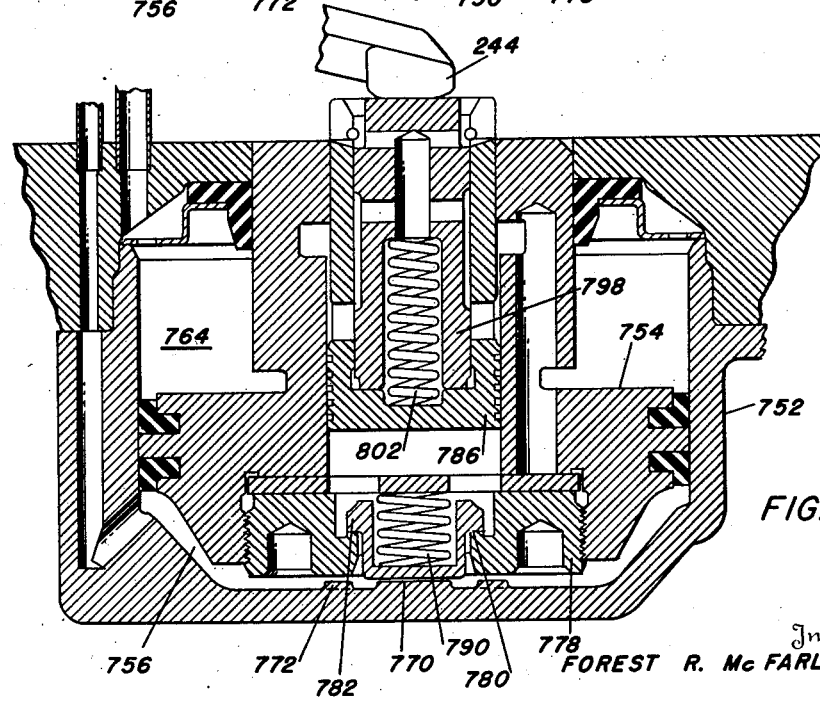
FIG_7
Inventor
FOREST R. McFARLAND
By Davis, Lindsey, Hibbens + Noyes
Attorney United States Patent Office 2,769,307
Patented Nov. 6, 1956

2,769,307

HYDRAULICALLY OPERATED SERVO-MOTOR

Forest R. McFarland, Huntington Woods, Mich., assignor to Studebaker-Packard Corporation, a corporation of Michigan Application July 14, 1950, Serial No. 173,789

4 Claims. (Cl. 60—97)

This invention relates to servo-motors and particularly to hydraulically operated servo-motors adapted to be used to operate a friction coupling such as a brake or a clutch. For purposes of illustration this invention will be described with reference to its use with a brake forming part of an automotive transmission, but it is understood that its field of application will not be limited to this use.

This application is a continuation-in-part of my U. S. Patent No. 2,694,948, dated November 23, 1954.

Any servo-motor adapted to operate a friction coupling device such as a brake or a clutch must be capable of applying the operating force gradually to avoid damaging shock to the device and to the associated apparatus. In the case of a brake used as a part of an automatic automotive transmission, a sudden automatic application of the full brake operating force would result in an unpleasant lurch in the vehicle which is uncomfortable to the occupants of the vehicle as well as damaging to the vehicle itself.

The principal object of this invention is to provide a hydraulically operated servo-motor which will apply an operating force to a brake or the like smoothly and positively.

There is always some lost motion in every friction device since the driving and driven elements of the device must be out of contact with each other when it is not operating. If they remained continuously in contact, the relative motion between them would soon cause destructive wear as well as heat. The operation of a friction coupling device therefore involves two stages, the first stage taking up lost motion or slack and the second stage applying the operating force itself. Correct application of the operating force requires that the lost motion be taken up as quickly as possible, but that the operating force be applied gradually and smoothly.

Another object of this invention therefore is the provision of a servo-motor for a friction coupling device wherein means are provided for taking up slack quickly and then applying the operating force gradually.

A more specific object of this invention is to provide a hydraulically operated servo-motor which is in effect two such servo-motors, one being fast operating and functioning to take up slack and the other being gradual in operation and supplying the operating force.

In the form shown in my aforesaid pending application, gradual operation of the force applying servo-motor is effected by providing a back pressure for the motor which is controlled by a metering orifice in the hydraulic system of which the servo-motor is a part. This requires the provision of a valve separate from the servo-motor which is sometimes difficult to make and control, particularly when its function is required to be intimately associated with the operation of a multi-stage device such as a friction bake.

Another object of this invention thus is to provide a valve in a servo-motor of the type herein referred to wherein the valve controlling the back pressure is operated as a function of the operation of the motor itself to remove the back pressure at the proper time and thus to speed up the application of the operating pressure without at the same time detracting from the smooth operation of the device controlled thereby.

A specific object of this invention is to provide a servo-motor for operating a friction brake or the like wherein the servo-motor is in the form of a valve nested with a plurality of nested pistons connected in series so that the hydraulic operating force is applied to one of the pistons and the final mechanical force is applied to the brake by the valve which is last in the series. One of the pistons, in addition to transmitting the hydraulic pressure also serves as a valve to control the hydraulic pressure acting on the adjacent piston.

These and other objects and features of this invention will become apparent from the following detailed description when taken together with the accompanying drawings which form a part of the description and in which Fig. 1 is a section through a friction brake used in an automatic automotive transmission, the section showing a servo-motor for the brake made in accordance with this invention;

Fig. 2 is an enlarged view of the servo-motor shown in Fig. 1;

Fig. 3 is a fragmentary bottom view of a valve used in the servo-motor, the view being taken along line 3—3 of Fig. 2;

Fig. 4 is a section taken through a modification of the servo-motor of Figs. 1 and 2; and Figs. 5 to 7 inclusive show the modified servo-motor of Fig. 4 in successive stages of operation.

The servo mechanism shown in Figs. 1 to 3 is identical to that shown in my U. S. Patent No. 2,694,948, dated November 23, 1954, in connection with an automatic automotive transmission. The associated apparatus and brake there shown comprise a transmission housing having an internal boss 216 in which is adjustably mounted a reaction pin 234 connected to one end 230 of a brake band 174 constituting the movable element of the brake. The brake drum is shown at 175 and constitutes the element toward which the band 174 moves. Normally there is a small amount of slack or lost motion in band 174 when it is disengaged so as to decrease wear as aforesaid. The other end 236 of brake band 174 is connected by a strut 238 to a recessed arm 239 of a ball crank 240 which is pivoted at 242 to the housing. The other arm 244 of bell crank 240 bears against the outer end of a piston 246 reciprocably mounted in a piston rod 247 formed integrally with a large piston 248. The cylinder in which piston 248 operates is comprised of a cup-shaped casting 250 which is secured by bolts 251 to a valve block having an opening 254 through which piston rod 247 extends and which serves as a guide for said rod.

Piston 246 is enlarged at its lower end and an annular ring 245 is provided at the upper end of the enlargement so that upward movement of said piston can be effected without displacing a large amount of fluid. The annular ring is in communication with a passage 278 which in turn communicates with chamber 256 behind piston 248. Fluid in chamber 256 can escape through a passage 257, a conduit 253 and a metering valve 255, the latter being shown only in outline.

Fluid under pressure is introduced into the chamber 274 beneath piston 248 through a passage 275 controlled by a valve mechanism in accordance with the designated principle of operation of the transmission described in my U. S. Patent No. 2,694,948, dated November 23, 1954, of which the servo-motor is a part. Piston 248 bottoms on casting 250 by means of a nut 260 which has a plurality of passages 261 for conducting the fluid from chamber 274 to the center of the nut 260. A plate valve 266 is adapted to seat on an annular rib 270 on nut 260, but a boss 271 on valve 266 prevents said valve from seating on rib 270 when nut 260 bottoms on casting 250, and thus under these conditions fluid from chamber 274 may pass around valve 266 through openings 264 in a plate 262 secured to piston 248 by nut 260. As shown in Figs. 1 to 3, a spring 268 is compressed between plate 262 and valve 266 and normally tends to urge valve 266 toward its seat 270. Thus valve 266 is urged in one direction by spring 268 and in the other direction by fluid pressure in chamber 274 or by contact with casting 250.

Any fluid pressure entering openings 264 will act against the enlarged end of piston 246 and tend to push said piston upward to rotate bell crank 244 counterclockwise and operate the brake. This fluid pressure will be opposed by the back pressure in chamber 256 acting upon the small area 245. The back pressure is created by allowing the space 256 to become full of fluid and then metering the flow through metering valve 255 as pressure is built up in chamber 274. Although initially the unit back pressure is greater than the unit pressure in chamber 274, the total load acting to push piston 246 up is greater than the total load acting on area 245 due to the great difference in the areas on each side of the piston. Since area 245 is small relative to the size of the area of the lower end of piston 246 in space 256, actually approximately 1/35 the area of the piston in space 256, piston 246 will move relatively quickly, the displaced fluid behind the effective area 245 escaping through the metering valve 255. Piston 248, however, will be prevented from moving upward by the back pressure in chamber 256 until piston 246 has taken up all of the slack in band 174, at which time the resistance to continued upward movement of said piston 246 will build up quickly.

When piston 246 has taken up the slack in band 174 the pressure on both sides of plate valve 266 becomes equalized and the entire area of piston 248 is then effective to counteract the back pressure acting on the opposite side of said piston 248. This causes piston 248 to move upward so that nut 260 no longer bottoms on casting 250, and spring 268 then is able to seat valve 266 on rib 270 to lock the entrapped fluid between valve 266 and piston 246. The entrapped fluid acts as a rigid column to transmit the operating pressure of piston 248 to bell crank 240 to operate the brake.

The release of brake band 174 is effected by venting chamber 274 and allowing fluid under pressure to enter space 256 through the valve 255. This forces piston 248 down until nut 260 bottoms on casting 250, and then forces piston 246 down against plate 262 due to pressure in chamber 256 transmitted through passage 278 applying a load against area 245 at the lower end of piston 246 after plate valve 266 is raised off seat 270 by contact with casting 250. Downward movement of piston 248 makes possible a slight upward movement of valve 266 in piston 246 to relieve the pressure of any fluid that may be trapped above valve 266 to facilitate the downward movement of piston 246 described above. The band 174 will, however, be loose before boss 271 strikes casting 250 and hence there will be no appreciable resistance to the unseating of valve 266 to prepare the valve for the next operation of the piston.

It will be apparent that the brake operating mechanism shown in Figs. 1 to 3 will provide a fast take-up of the brake band and that further operation of the mechanism is controlled entirely by the back pressure in space 256. If the fluid in space 256 is not permitted to escape quickly, piston 248 cannot move upward quickly, and an unnecessarily slow operation of the brake will result. Calibration of the metering valve 255 to properly time the movement of the piston 248 after the completion of the movement of the piston 246 is somewhat more sensitive than a mechanical means of venting the space 256 after the proper movement of the piston 246 has occurred. This mechanical means to control venting which means reduces sensitiveness in functioning is shown in Figs. 4 to 7. To coordinate the operation of the brake with the operation of the metering valve 255 would introduce an additional complication which would not be desirable.

In the form shown in Figs. 4 to 7 means are provided for automatically venting the space 256 after the slack has been taken up in band 174 so that there is relatively little back pressure to hold back piston 248. The upward movement of the piston is controlled by the fluid in chamber 274 except for whatever metering action is provided by the venting means.

Referring now to Fig. 4 there is shown a valve block having a cup-shaped casing 752 secured thereto, said casing 752 constituting a cylinder for a piston 754. The chamber 756 below piston 754 communicates through passages 758 and 760 and conduit 762 to a valve and source of fluid under pressure (not shown). The space 764 above piston 754 communicates through an apertured plate 766 and a conduit 768 to a metering valve (not shown). The center of the casing 752 has a boss 770 ringed by an interrupted bead 772; the latter being adapted to permit the flow of fluid from chmaber 756 to an annular space 774 aligned with an opening 776 in a nut 778 secured to piston 754. Said nut 778 bottoms on bead 772 so that when the piston 754 is at the bottom of its stroke, fluid may still pass from chamber 756 to opening 776.

The upper end of opening 776 as viewed in Fig. 4 is defined by a bead 780 which forms the seat for a valve 782. When nut 778 bottoms on bead 772, valve 782 is held off its seat 780 by boss 770. This permits the fluid to pass through valve 782 and through an apertured plate 784 which is held in piston 754 by nut 778. Plate 784 serves to limit the downward movement of a piston 786 nested in piston 754 and in its piston rod 788. Said plate 784 also serves as an abutment for a spring 790 which functions to hold valve 782 on its seat 780.

Piston 786 is also a piston valve having a portion of reduced diameter 792 to provide a small differential piston area 793 on the upper side of the said piston. The area 793 is in communication with a groove 794 which is connected by a drilled passage 796 to space 764, which, as stated above, is connected to conduit 768 and to a metering valve. Thus piston 786 is subjected at its underside to fluid at the pressure obtaining in chamber 756 and at its upper side to the fluid pressure obtaining in space 764.

Within piston 786 is nested a valve 798 the end 800 of which contacts arm 244 of bell crank 240 (Fig. 1) and is the pressure transmitting means for piston 754. Said valve 798 is held against snap ring 814 by a spring 802 located in a bore 804 and compressed between piston 786 and the upper end of bore 804. A smaller bore 806 connects bore 804 with two cross bores 808 and 810, bore 808 communicating with an annular groove 812 in the outer surface of valve 798 and bore 810 communicating with the exterior of the valve and constituting the vent for the valve. The snap ring 814 limits the outward movement of the valve 798 in piston 786.

The length of groove 812 is such that when valve 798 is in its uppermost position it will be out of register with a cross bore 816 in piston 786. When valve moves downward in piston 786 a slightly greater distance than the amount of overlap shown in Fig. 4, the fluid in space 764 will be vented through groove 812, cross bore 808, bore 806 and cross bore 810.

The operation of the servo-motor will be described with reference to Figs. 4 to 7. In these figures, the servo-motor is shown in four stages of operation to illustrate the principal relative positions of the pistons and valves. The inoperative or released position of the servo-motor is shown in Fig. 4. As described above, piston 754 is in its lowermost position in casing 752, with nut 778 bottoming on interrupted bead 772. Valve 782 is held off its seat 780 by boss 770 so that should fluid under pressure be admitted into chamber 756, it will pass through valve 782 and the apertured plate 784 to the underside of piston 786. When fluid under pressure is admitted to space 764 through conduit 768, it acts against the upper side of piston 754, thereby tending to hold the servo-motor in its released position. Through passage 796 and groove 794 the fluid under pressure from space 764 is conducted to the opposite side of piston 786 to hold the said piston 786 in its lowermost position, which, in turn, holds valve 798 down and allows arm 244 to fall to its released position. It will be noted, however, that spring 802 holds valve 798 in its closed position relative to cross bores 816 so that the fluid pressure in space 764 is maintained to cushion the subsequent operation of the piston 754.

When fluid under pressure is admitted through conduit 762, and passages 760 and 758 to chamber 756, the first stage of operation of the servo-motor causes the slack or lost motion in the lever system between arm 244 and the brake itself to be taken up, as shown in Fig. 5. This includes the movement of the brake band to contact the brake drum, or in the case of a clutch operated by the servo-motor, movement of the pressure plate toward the clutch disc. Due to the maintenance of fluid pressure in space 764, piston 754 remains in its lowermost position with nut 778 bottoming on interrupted bead 772, and fluid under pressure passes through valve 782 to the underside of piston 786. Due to the difference in effective areas on the bottom and top sides of piston 786, the total pressure tending to raise the piston is greater than the total pressure tending to lower the piston and consequently piston 786 will move upward in rod 788. The resistance exerted by arm 244 to this movement will be less than the force exerted by spring 802 while the lost motion in the brake linkage is being taken up, and hence valve 798 will retain its relative position with respect to cross bores 816 and maintain the fluid pressure in space 764. While piston 786 is moving up the oil trapped in the space 764 prevents movement of the piston 754 even though its undersurface is subjected to oil pressure in chamber 756. The piston 754 is therefore forced to remain in its lowermost or inoperative position.

After the lost motion has been taken up, the resistance to further upward movement of the valve 798 increases suddenly and surpasses the force of spring 802, causing piston 786 to continue its upward movement while valve 798 is stationary until piston 786 strikes the end 818 of valve 798 (Fig. 6). The relative movement of piston 786 and valve 798 causes groove 812 to communicate with cross bores 816 and thereby vent the fluid pressure in space 764 through said groove 812, cross bores 808, bore 806, and cross bores 810. It will be noted that the fluid pressure acting on both sides of valve 782 under these conditions is the same and the valve consequently will move in accordance with the dictates of spring 790. The cessation of movement of valve 798, followed by the cessation of movement of piston 786 allows the pressure in chamber 756 to move the piston 754 upward. The first slight movement of the piston 754 permits the seating of the valve 782 as described. This permits the pressure on piston 754 being transmitted through the oil trapped between the piston 754 and the piston 786 to the abutting piston 798 and the lever 244. This condition is shown in Fig. 7.

Referring now to Fig. 7, when piston 754 has moved upward sufficiently to raise nut 778 off bead 772 and valve 782 off boss 770, said valve 782 will be seated on bead 780 by spring 790, thereby trapping the fluid between piston 786 and valve 782. The trapped fluid acts as a solid column to transmit fluid pressure from piston 754 to piston 786 and thence to valve 798 and lever 244. With the space 764 vented through valve 798, the full operating pressure of the fluid in chamber 756 is immediately effective to move piston 754 and lever 244 to its operative position, thereby giving a rapid operation to the brake or other friction device controlled thereby.

Pistons 248 and 246, and pistons 754 and 786 are sometimes referred to as compound pistons and hence where this term appears in the claims, it is understood that devices such as these pistons are intended.

It will be apparent that the two forms of servo-motor described above will provide a soft operation of the friction coupling device. The form shown in Figs. 4 to 7 is the less sensitive of the two but since the back pressure on the piston is quickly and automatically removed at precisely the right instant, the venting pressure can be varied in degree without affecting the preciseness of the timing. Either form can be used to operate either a clutch or a brake, and in fact can be used to operate any coupling device having two members, one of which is movable toward the other in two stages, the first taking up the lost motion or slack in the movable member and the other applying the operating pressure.

It is understood that the foregoing description is merely illustrative of preferred embodiments of this invention and that the scope of the invention therefore is not to be limited thereto, but is to be determined by the appended claims.

What is claimed is:

1. An operating device for effecting an engaging or releasing action, said device comprising a cylinder, a first piston in the cylinder which is connected on one side to receive fluid under pressure to drive the piston in an engaging direction and on the other side to receive a cushioning fluid, a second piston carried by the first piston, a vent valve carried by the second piston, means for supplying fluid pressure for moving the second piston relative to the first piston, said valve and first and second pistons having interconnected passageways connected to vent the cushioning fluid when full engaging pressure is developed upon movement in said engaging direction.

2. An operating device for effecting an operating and releasing action, said operating device comprising a cylinder, a first piston in the cylinder, a second piston carried by the first piston, a normally closed vent valve carried by the second piston, said first piston having passages connecting the top and bottom sides of the second piston with the corresponding sides of the first piston such that both pistons tend to move in the same direction, a normally closed valve carried by the first piston and adapted to control the passage connecting the bottom side of the second piston with the corresponding side of the first piston, said vent valve controlling the passages connecting the top side of the said pistons, means on the cylinder for opening the normally closed valve when the first piston is at the end of its return stroke, and means for opening the normally closed vent valve carried by the second piston when the first piston begins to move in its operating stroke, whereby to vent the opposite side of the pistons.

3. An operating device for effecting an operating and releasing action, said device comprising a cylinder, an operating piston in said cylinder, a piston in said operating piston, means for trapping fluid between said pistons whereby the force exerted by the operating piston is transmitted to the other piston through the trapped fluid, a vent valve in said other piston, there being passages for fluid in the said other piston and in the operating piston including cross bores, said valve having passages adapted to be aligned with the cross bores to vent said cross bores, spring means opposing the force exerted by the operating piston and normally holding the valve out of alignment with the cross bores to prevent venting of the cross bores until the operating pressure exceeds the spring pressure, means for transmitting the operating pressure from the said other piston to the valve to move the valve to align the cross bores with the passages and vent said cross bores and passages, a source of fluid under operating pressure adapted to be introduced into the cylinder on one side of the operating piston, and a cushioning fluid in the cylinder on the opposite sides of the operating piston, said cushioning fluid being vented through the cross bores and passages as aforesaid when operating pressure is applied to the operating piston.

4. An operating device as described in claim 3, the means for trapping fluid between the pistons comprising a normally closed valve and means for holding the said normally closed valve in open position at the beginning of the operating stroke of the operating piston.

References Cited in the file of this patent

UNITED STATES PATENTS

| | | |
|---|---|---|
| 1,822,690 | De Leeuw | Sept. 8, 1931 |
| 1,865,105 | Houplain | June 28, 1932 |
| 1,990,052 | Sosa | Feb. 5, 1935 |
| 2,170,851 | Carroll | Aug. 29, 1939 |
| 2,227,245 | Carroll | Dec. 31, 1940 |
| 2,458,976 | Campbell | Jan. 11, 1949 |
| 2,463,537 | Hoar et al. | Mar. 8, 1949 |
| 2,513,192 | McFarland | June 27, 1950 |
| 2,638,750 | Hettinger | May 19, 1953 |
| 2,675,678 | English | Apr. 20, 1954 |

FOREIGN PATENTS

| | | |
|---|---|---|
| 521,980 | Great Britain | June 5, 1940 |